March 1, 1955 R. D. SHIELDS 2,703,061
CLOSURES FOR INSPECTION OPENINGS OF FURNACES
Filed Nov. 13, 1950 2 Sheets-Sheet 1
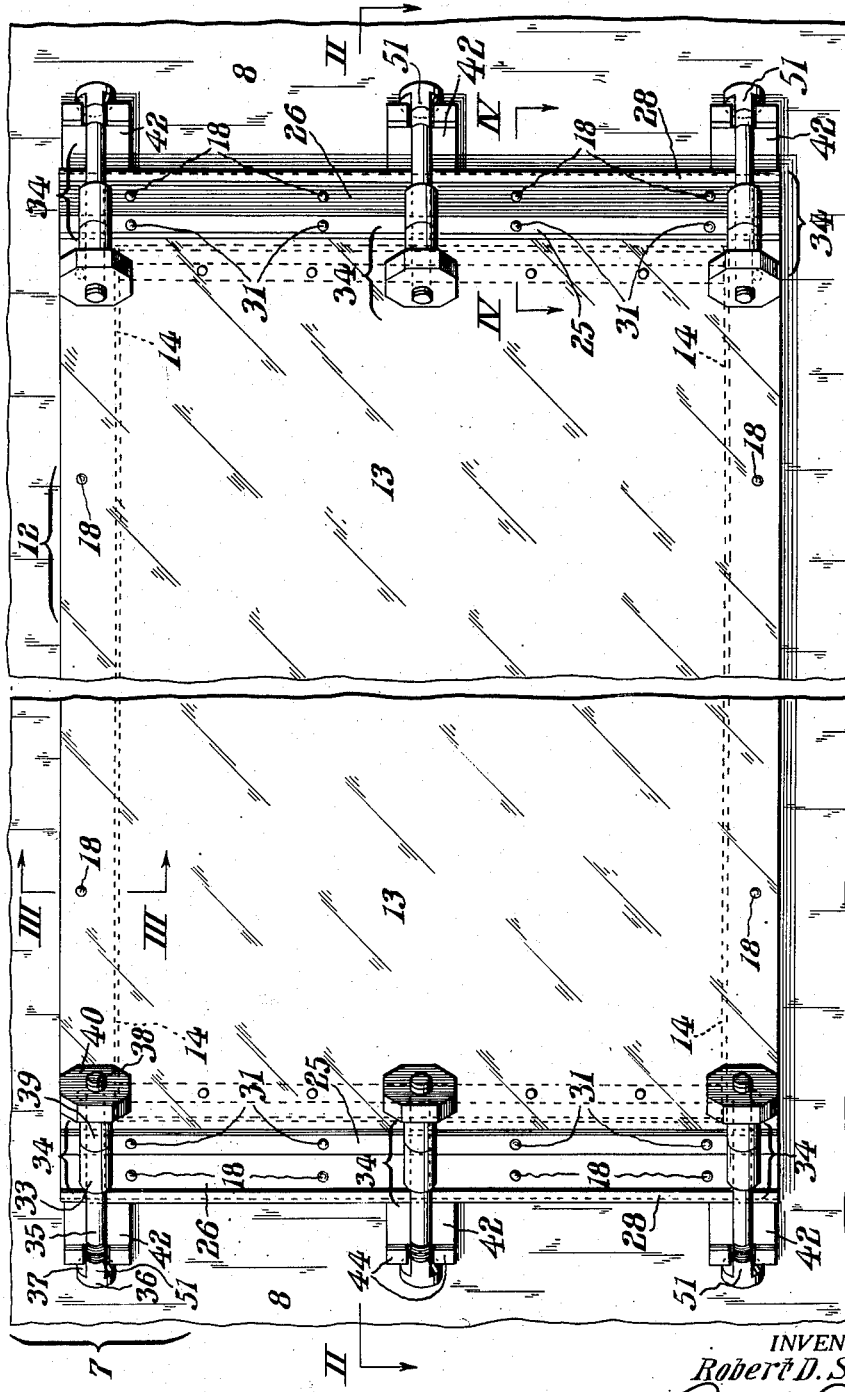
INVENTOR:
Robert D. Shields
BY Paul & Paul
ATTORNEYS.

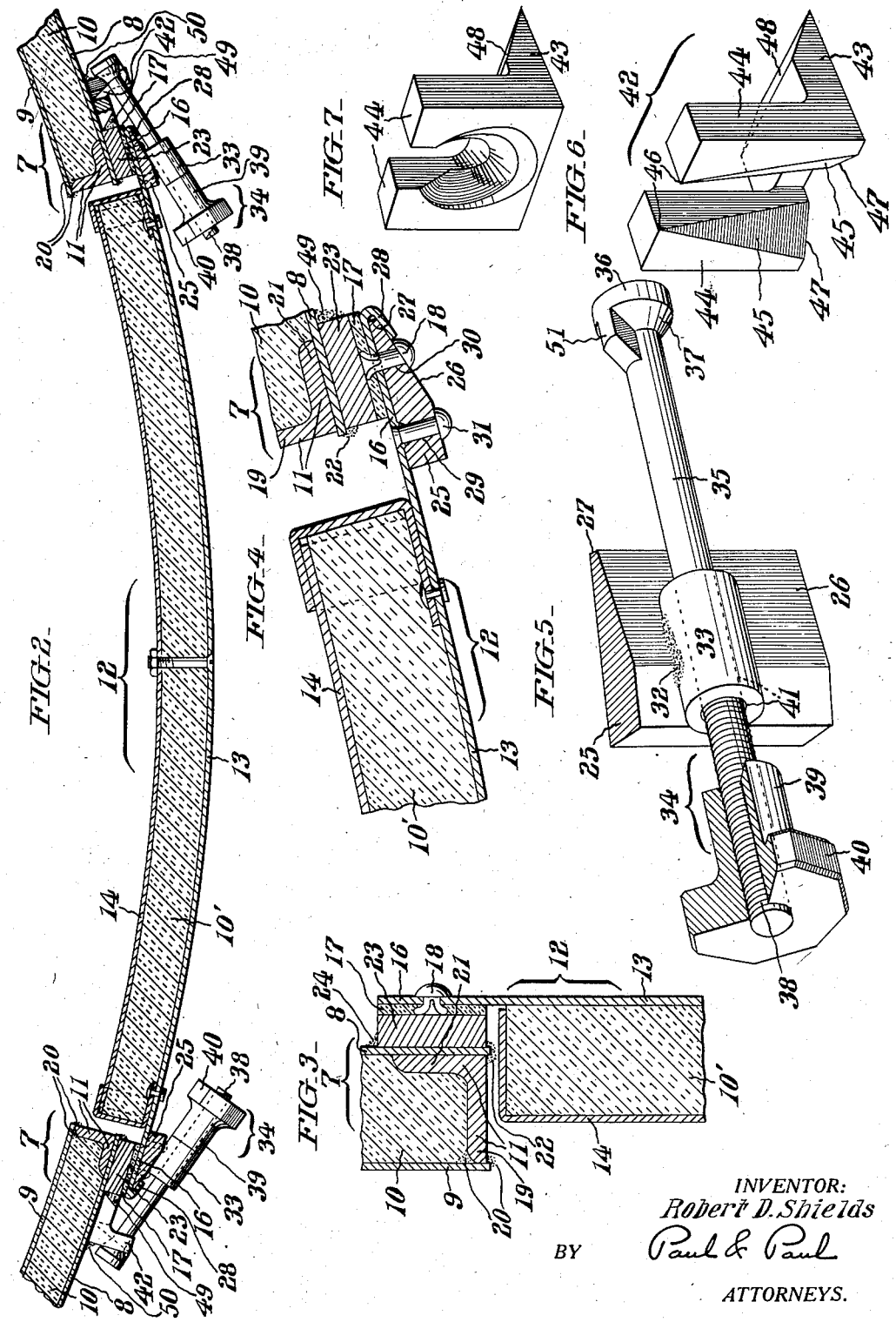

United States Patent Office 2,703,061
Patented Mar. 1, 1955

2,703,061

CLOSURES FOR INSPECTION OPENINGS OF FURNACES

Robert D. Shields, Altoona, Pa.

Application November 13, 1950, Serial No. 195,283

2 Claims. (Cl. 110—173)

This invention relates to closures for inspection openings of steam generators and other furnaces. In such furnaces one or more inspection closures are often necessary to afford occasional access to parts otherwise inaccessible. Such doors are usually closed by bolts or screws. Owing to the high temperatures to which they are subjected, such closures warp and become distorted. They, therefore, require strong bolting to hold the closures firmly sealed. It is also usual to interpose a gasket (as of asbestos) with a sealing compound on both sides between the edges of the closures and its opening in order that the effects of the inevitable distortion may be minimized.

The excessive heat to which such closures are subjected occasions some softening of the metal parts including the bolts and screws used in securing them, and this is followed by freezing of bolt or screw with the surrounding parts, preventing opening of the closures except after excessive hammering and cutting away of parts after which holes must be redrilled and tapped so that resecuring of the closures becomes difficult. Also, where bolts or screws pass through an interposed gasket, their removal tends to tear and injure the gasket, increasing the difficulty of resecuring the closures.

According to this invention I place the bolts by which the closures are secured outside the generator and somewhat spaced therefrom, thereby lessening the temperatures to which they are subjected and preventing the freezing of the bolts and their surrounding parts and rendering unbolting and removal of the closure a simple and expeditious matter. Because the bolts are wholly external to the generator, I am enabled to position the bolts laterally so that their tightening creates a strong lateral tension. If, as is usually the case, the furnace is cylindrical, the closure will have a curved upper and lower edge but straight sides. If then the bolts are at the sides of the closure when they are tightened, they can "stretch" the closure over its closure frame whereby the curved upper and lower edges of the closure are drawn more closely to the frame than can be accomplished by bolts which extend more or less radially in relation to the center of the furnace. Because the bolts are spaced from the furnace wall I avoid their passage through the gasket and its consequent injury when the closure is removed. Furthermore, by riveting the gasket to one of its contacting surfaces, preferably the closure flange, it is kept from injury when the closure is opened.

I will describe an embodiment of my invention as adapted to a steam generator used on a diesel-electric locomotive, but this is only by way of example, for my inventive idea is capable of a wide variety of applications.

In the drawings:

Fig. 1 is a broken fragmentary view of an embodiment of my invention as applied to the steam heat generator of a diesel-electric locomotive.

Fig. 2 is a cross-section taken substantially as indicated by the angled-arrows II—II in Fig. 1.

Fig. 3 is a fragmentary sectional view taken as designated by the arrows III—III in Fig. 1, but drawn to a larger scale.

Fig. 4 is a similar scale sectional view to the preceding but taken as indicated by the angled arrows IV—IV in Fig. 1.

Fig. 5 is a fragmentary and part sectional perspective view of the spaced bolting mechanism forming a part of my invention, which will be hereinafter fully described.

Fig. 6 is a perspective view of the keeper for anchoring the bolt head of Fig. 5; and, Fig. 7 is a perspective view of an alternative form of keeper.

In describing the illustrated embodiment of my invention shown by the drawings, specific terms will be employed for the sake of clarity; but it is to be understood that such terms are used in a descriptive sense only and not for purposes of limitation.

Referring more in detail to the drawings a fragmentary section of a steam heat generator wall is designated by the reference character 7. This wall 7 comprises spaced outer and inner shells of sheet metal 8, 9 respectively, between which a layer of thermal insulation 10 is interposed, the section being taken regionally about the inspection opening frame 11.

The separable closure 12, with which the present invention is more especially concerned, is rectangular in configuration and curved to conform substantially to the rounding of the furnace wall. As shown, it comprises an outer sheet metal component 13 and an inner component 14 of like material which is recessed for retainment of an intervening filler of heat insulating medium 10'. The component 14 with the contained filler 10' is secured to the element 13 in the manner shown in Figs. 2, 3 and 4, with provision of a projecting flange 16 around the closure. This flange is faced at the back with a compressible sealing gasket 17 of asbestos or the like which is held in place by spaced split rivets 18, as shown to best advantage in the right hand portion of Fig. 4.

The inspection opening frame 11 is of angle-section stock, its radially directed flange 19 being united to the inner shell 9 of wall 7 by spaced welds 20, see Figs. 2 and 3; and its circumferentially directed flange 21 abutting the outer shell 8 and secured thereto by welding 22, see Figs. 3 and 4. The inspection opening is provided with an annular seat-member 23 which is seam-welded at 22 and 49, to the outer shell 8.

Affixed to the component 13 at the exterior of closure 12 adjacent its opposite straight side edges are reinforcing bars 25 of wedge-shaped cross-section, best shown in Figs. 5 and 4; that is to say, each said bar is suitably formed or chamfered to embody an inclined taper portion or bevel 26, extending lengthwise thereof, over the thinner edge 27 whereof the edge portion 28 of the associated flange 16 is retroverted and clinched thereto. The rigid bars 25 are drilled at spaced intervals to provide holes 29, 30 respectively for reception of retainer rivets 31, and the split-rivets 18 hereinbefore mentioned, whereby the bars 25 are permanently secured to the flange 16, and the related sealing strip portions 17 made a fixed part of the door unit 12.

Secured to the bars 25 by welds 32 and projecting out from the furnace wall are tubular bearing bosses 33 which carry the sliding bolts 34. Each bolt 34 (see Fig. 5) has a plain shank portion 35 with a head 36, at one end, including a frusto-conical section 37 merging to said shank portion, and a screw-threaded part 38 which passes through the bearing 33 and carries the nut 39 provided with a manipulating section 40. The threaded bolts 34 find slidable and bearing support in the plain bores 41 of the bearing bosses 33, whereas the heads 36 with their frusto-conical sections 37 find anchorage between the jaws of bifurcated keeper lugs designated 42 in Figs. 1, 2 and 6. To prevent the bolt from turning when it is tightened by turning the nut, I form upon the bolt head 36 a key projection 51.

Each keeper lug 42 (see especially Fig. 6) is generally L-shaped, that is to say it embodies a solid base 43 and two spaced jaws 44 projecting angularly from the base. The key projection 51 of the bolt head is received between the spaced jaws. The jaws 44 have their opposed faces progressively undercut from the points 46 to the points 47, and these undercuts are in such angular relation to the generator wall as to firmly retain the head of the bolt when the nut is tightened against the boss. In this retention the conical shape of the underside of the bolt head plays its part. In case the alternative form of conically-socketed keeper lug shown in Fig. 7 is used, the conical shape of the bolt head engages the keeper lug somewhat more fixedly. In either case the contacting surfaces of the bolt heads and of the keeper lugs are so related and constructed that upon tightening of the nuts the closure is firmly held in place, especially since the bolts are slightly inclined in relation to the wall of the furnace. It is this position of the bolts which enables me to space them from their surrounding parts sufficiently far out from the wall of the furnace to insure a much lower temperature for these parts. Furthermore, the contacts of the bolt heads with the jaws of the keeper lugs and of the threaded surface of the bolts to the inside of the bosses are mere part line contacts which afford little opportunity for freezing, should any softening of the parts occur.

I have, therefore, found that by reason of this positioning of the bolts, I am enabled to get the required firm fastening of the closure to its frame even though some warping occurs, without lessening the facility with which the closure may be backing off the nuts. Furthermore, by reason of this out-spacing of the bolts, they do not pass through or contact with the sealing gasket which is interposed between the flange of the closure and the wall of the furnace and, therefore, the easement of the bolts for removal of the closure does not break this strip which may be permanently fastened to either the flange of the closure or to the wall, preferably the former, so that no disturbance of the gasket occurs when the closure is removed.

From the foregoing it will be seen that the securing means, i. e. the bolts 35 are carried by the closure and retained by the latter when it is bodily removed. In applying the closure, the portions of the bolt shanks between the outer ends of the retaining bosses 33 and the bolt heads 36 are entered into the clevises of the aligning keeper lugs 42 on the furnace wall. As the nuts 39 are tightened, the medial portion of the perimetric flange 16 of the closure will first be brought into tight contact with the frame 23 around the inspection opening in the furnace wall 7. Eventually, due to the slope of the bolts 35, the straight-edged end portions of the closure will be urged inward into close contact with the corresponding end portions of the frame 23, and the closure placed in tension longitudinally. In this action, the strains imposed by tightening of the nuts 39, will be equalized through the medium of the reinforcing bars 25, with the result that the closure is drawn into effective sealing conformity with the entire margin around the inspection opening of the furnace. Subsequent accidental displacement of the bolts 35 is impossible by reason of the engagement of their conical heads 36 into the recessions formed by the opposing bevels 47 on the portions 44 of the keeper lugs 42 or within the conical sockets of keeper lugs of the alternative type illustrated in Fig. 7. As the wall of the furnace expands circumferentially under the action of the heat, further compensative stretching of the closure will of course take place so that tightness of the seal is assured under all conditions of furnace operation. Because the sides of the closure have a perfectly straight edge, they can be reinforced by a strengthening bar over which the edge of the closure is retroverted. This overcomes any tendency of the lateral tensions to tear single attachments from the closure. These lateral tensions suffice to tightly seal not only the sides of the closure, but also its top and bottom, so that no vertical tensions are involved thereby avoiding any likelihood of tearing such top and bottom attachments from the closure if they were employed. For it is not feasible to distribute such vertical tensions by a reinforcing bar because of the curved configuration which would be required for such a bar.

As a result of these changes in construction and of the securing and sealing means, I am enabled to open the inspection door in but a few minutes time, whereas in previous constructions often a very long time was thus consumed and the resecuring of the door after inspection a very laborious process.

Having thus described my invention, I claim:

1. In combination, a furnace having an outwardly-rounded substantially cylindrical wall with an inspection opening therein; a bodily removable closure comprising a rectangular panel of relatively thin flexible sheet metal of an area to cover and to marginally overlap the perimetric edges of the inspection opening, said panel being provided along opposite vertical end edges with permanently affixed reinforcing bars, said bars having outwardly bevelled surfaces which are inclined inwardly toward said sheet metal panel and oppositely toward said vertical edges thereof, and the bevels being overlapped by outwardly retroverted margins of said end edges, and said bars being formed at spaced lengthwise intervals with transversely-arranged apertured bosses whereof the axes are parallel to said bevelled faces; clevised keeper lugs affixed to outer face of the furnace wall adjacent the opposite side edges of the inspection opening which extend axially of the wall respectively with their clevis notches in axial alignment with the bosses on the reinforcing bars on the closure; draw bolts with heads engaged in the clevises of the respective lugs and with shanks passed through and protruding beyond corresponding bosses of the reinforcing bars; and draw nuts threadedly engaged upon the protruding ends of the respective bolt shanks to bear against those ends of the corresponding bosses of the reinforcing bars on the closure which are directed away from the clevised keeper lugs.

2. The invention according to claim 1, wherein the clevises of the keeper lugs are conically recessed coaxially with the bosses of the corresponding closure reinforcing bars; and wherein the heads of the bolts are coned to snugly fit the recesses of the lugs and provided individually with radial rotation-restraining key projections to lock into entrant notches of the lugs.

References Cited in the file of this patent

UNITED STATES PATENTS

| 781,371 | Sherman | Jan. 31, 1905 |
| 863,160 | De Wein | Aug. 13, 1907 |
| 1,720,478 | Jones | July 9, 1929 |
| 1,769,979 | Whittam | July 8, 1930 |
| 1,864,333 | Aldrich | June 21, 1932 |
| 2,035,901 | Ludington | Mar. 31, 1936 |
| 2,134,314 | O'Donnell | Oct. 25, 1938 |
| 2,533,674 | Locke | Dec. 12, 1950 |